March 22, 1966    D. A. KOHL    3,242,495
DIRECTION FINDER
Filed April 17, 1963    4 Sheets-Sheet 1

INVENTOR.
DOUGLAS A. KOHL
BY Kenneth D. Ohm
ATTORNEY

March 22, 1966 D. A. KOHL 3,242,495
DIRECTION FINDER

Filed April 17, 1963 4 Sheets-Sheet 2

INVENTOR.
DOUGLAS A. KOHL
BY Kenneth D. Ohm

ATTORNEY

March 22, 1966  D. A. KOHL  3,242,495
DIRECTION FINDER
Filed April 17, 1963  4 Sheets-Sheet 3
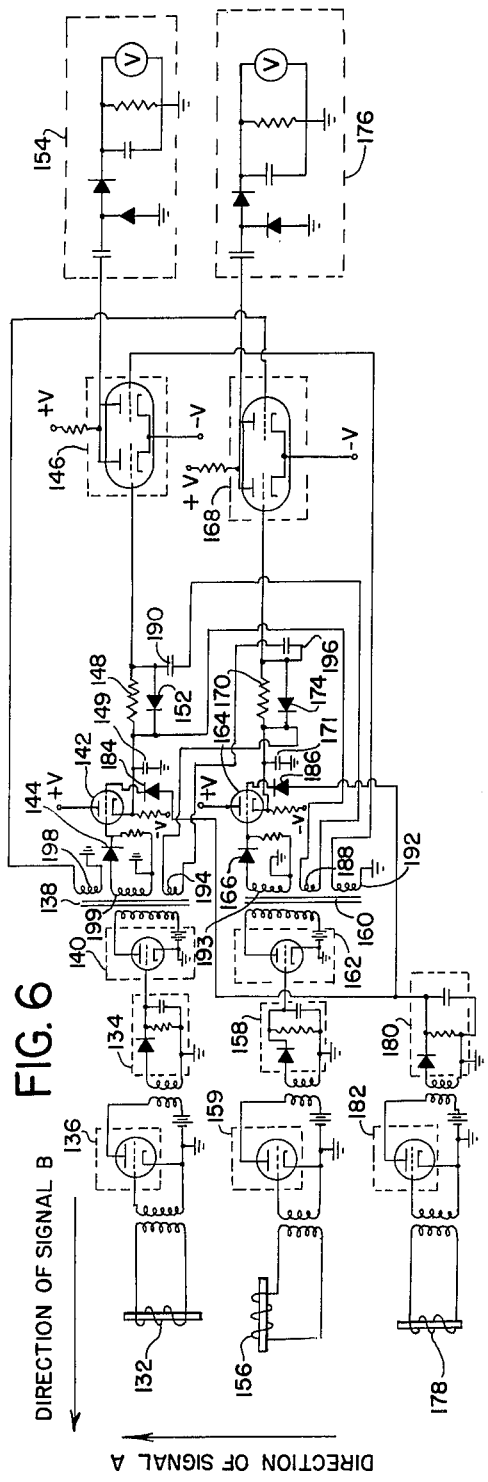
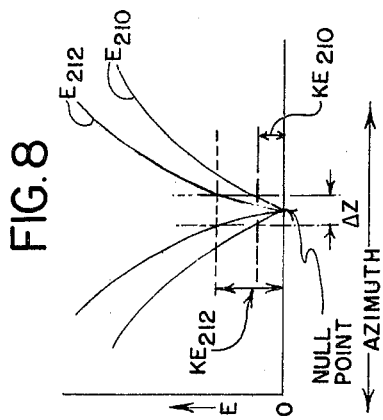
FIG. 8
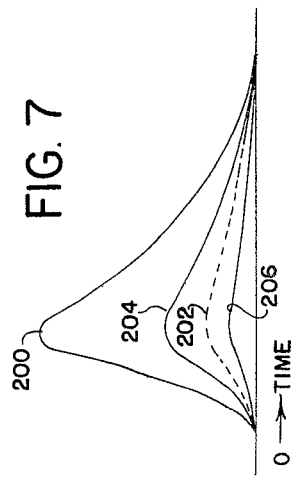
FIG. 7
INVENTOR.
DOUGLAS A. KOHL
BY
ATTORNEY March 22, 1966  D. A. KOHL  3,242,495
DIRECTION FINDER Filed April 17, 1963 4 Sheets-Sheet 4

INVENTOR.
DOUGLAS A. KOHL
BY Kenneth D. Ohm
ATTORNEY

United States Patent Office 3,242,495
Patented Mar. 22, 1966

1

3,242,495
DIRECTION FINDER
Douglas A. Kohl, Osseo, Minn., assignor, by mesne assignments, to Litton Systems, Inc., Beverly Hills, Calif., a corporation of Maryland
Filed Apr. 17, 1963, Ser. No. 273,677
15 Claims. (Cl. 343—119)

The present invention relates to improvements in direction finding receivers. More particularly, it pertains to null type direction finders for determining the direction from which electromagnetic signals are emanating.

The device comprising the invention includes at least two electromagnetic signal pickup means arranged at different angles so a signal from a given direction may be received by one of said means with a substantially minimum intensity and by the other of said means with a substantially maximum intensity and electrical circuits connected to said pickup means so the substantially minimum intensity signal operates on the substantially maximum intensity signal to provide the maximum positive signal when the device is detecting the exact direction from which the signal is emanating.

Some direction finder equipment currently in use identify the direction from which an electromagnetic signal emanates by the null or "no-output" condition of a null loop receiver. In such equipment there is no distinction between "no-output" due to the null loop orientation (i.e., the plane of the null loop being perpendicular to the signal) and "no-output" due to the electromagnetic signal disappearing. In addition, when using such equipment it is only possible to identify "off of null" (1) an intermittant signal such as a rapidly fading one, (2) a code station with irregular transmitting schedule, or (3) a signal which is being jammed.

Accordingly, one object of this invention is to provide a direction finder which will provide a positive output while one signal pickup means thereof is at substantially null.

A further object of this invention is to provide a direction finder for the detection of intermittant signals, such as sferics.

Another object of this invention is to provide a positive indication of the direction from which an electromagnetic signal emanates which positive indication has constant accuracy independent of the amplitude of the electromagnetic signal.

Other objects and advantages of the invention will be apparent from the following description in which certain preferred embodiments of the invention are disclosed. In the drawings which form a part of this application, FIGURE 1 is an electrical circuit diagram of apparatus constructed according to the present invention;

FIG. 6 is a schematic electrical circuit diagram of more apparatus constructed according to the instant invention;

FIG. 7 is a graph illustrating, in part, the operation of the apparatus of FIG. 6;

FIG. 8 is a graph illustrating, in part, the operation of the apparatus of FIG. 6.

Figure 1:
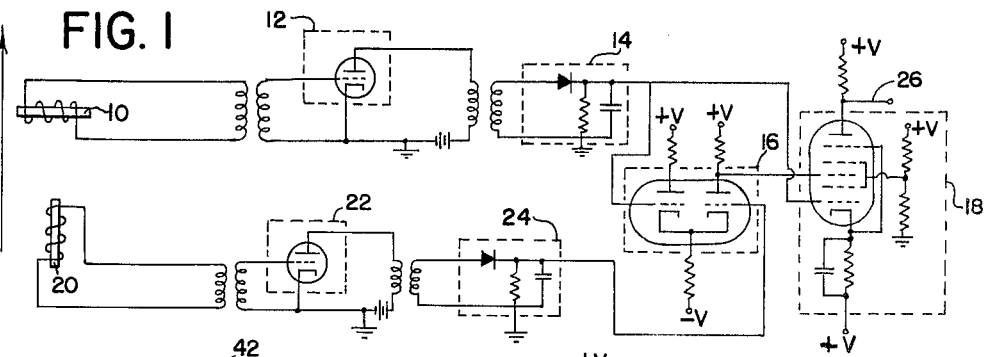

Referring now more particularly to FIGURE 1, a di-

2 rectional pickup coil 10 provides the input voltage to an amplifier 12. The term pickup coil as used throughout this specification includes all antennas such as loop antennas and ferrite core loop antennas which in one angular position pickup from a signal from a given direction minimum intensity and from another position maximum intensity from said signal. The output of the amplifier 12 provides the input to a detector 14. The output of the detector 14 is fed simultaneously to a difference amplifier 16 and a multiplier 18.

A directional pickup coil 20 provides the input voltage to an amplifier 22. The output of the amplifier 22 provides the input signal voltage to a detector 24. The output of the detector 24 is fed into the difference amplifier 16. The output of the difference amplifier 16 is fed into the multiplier 18 which provides a positive output signal indicative of the difference of the output of the detector 14 and the output of the detector 24 times the output of the detector 14.

When the pickup coils 10 and 20 are so disposed that the plane of reception of coil 20 is perpendicular to the line which points directly toward the electromagnetic signal of interest as indicated in the drawings, minimum voltage is fed from the detector 24 to the difference amplifier 16. At the same time, since the plane of reception of pickup coil 10 is disposed perpendicular to the pickup coil 20, the detector 14 provides maximum voltage to both the difference amplifier 16 and the multiplier 18. This combination produces maximum effect upon the output of the difference amplifier 16 which in turn provides maximum voltage at an output 26 of the multiplier 18.

Figure 2:
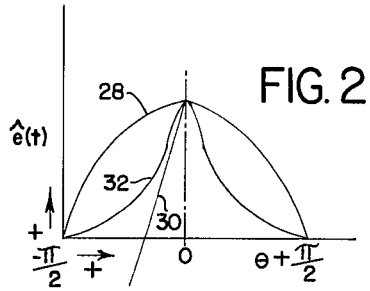
FIG. 2 is a graph illustrating, in part, the operation of the apparatus of FIG. 1.

FIG. 2 shows the variations in the output voltage of the multiplier 18 at the output 26. Curve 28 depicts the output of the pickup coil 10 as it swings through an angle of 180° in the horizontal plane about a vertical axis through the center of its horizontal longitudinal axis. Curve 30 depicts the gain of the multiplier 18 which is a variable gain amplifier. Curve 32 depicts the output voltage of the multiplier 18 measured at the output 26. As can be seen from FIG. 2, the output voltage of the multiplier 18 reaches a maximum when the plane of the pickup coil 10 is parallel to the direction vector pointing directly at the electromagnetic signal of interest.

Since the plane of the pickup coil 10 is at right angles to the plane of the pickup coil 20, it will be noted that for the apparatus shown in FIGURE 1 the rate of change of gain is everywhere equal to or greater than the change in voltage of the pickup coil 20 near null and thus the increase in the multiplier 18 output signal which is derived from the pickup coil 10 is as discriminating in defining the maximum multiplier output as the null pickup coil 20 would be in indicating a null or no output signal. Thus, the azimuth, i.e., the direction of the vector pointing directly at the electromagnetic signal of interest, is defined as coincident with the maximum output signal of the multiplier 18.

Figure 3:
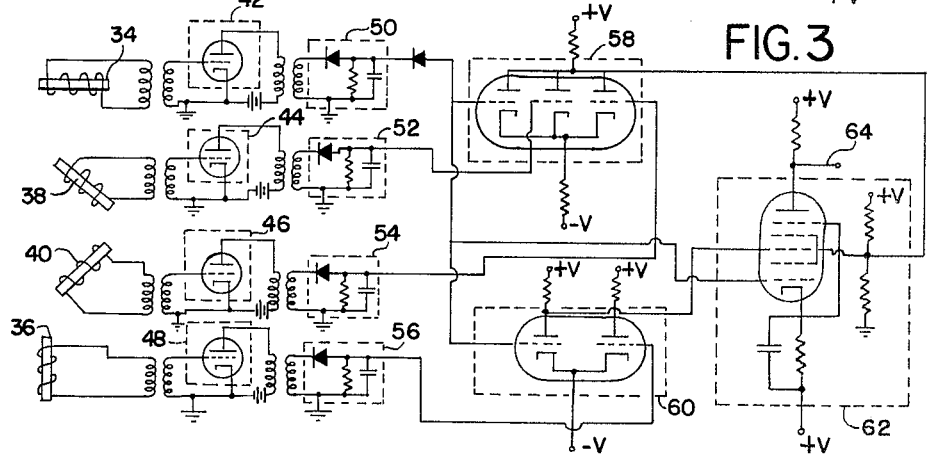
FIG. 3 is an electrical circuit diagram of a more complex form of the present invention.

FIG. 3 illustrates apparatus in which more than two directional pickup coils are used. In this system directional pickup coils 34 and 36 correspond to pickup coils 10 and 20, respectively. In addition to pickup coils 34 and 36, a pickup coil 38 is positioned with its loop plane (i.e., plane of reception) at an angle of 45° to that of the plane of the pickup coil 34 while another pickup coil 40 is positioned with the plane of its loop (i.e., plane of reception) perpendicular to the plane of the loop of coil 38. With the loops 38 and 40 so positioned, it will be readily apparent that when the coil 34 is in position to pick up the maximum signal that the coils 38 and 40 will pick up approximately .707 of their maximum.

The pickup coils 34, 38, 40, and 36 provide the input voltages to amplifiers 42, 44, 46, and 48, respectively. The output of the amplifiers 42, 44, 46, and 48, are fed into detectors 50, 52, and 54, and 56, respectively. The outputs of the detectors 50, 52, and 54 are fed into an AND circuit 58 while the output of the detector 56 is fed into a difference amplifier 60.

In addition to supplying one of the inputs to the AND circuit 58, the detector 50 also provides one input to the difference amplifier 60 and one input to a multiplier 62. The multiplier 62 receives another input from the output of the difference amplifier 60. In addition, the output of the AND circuit 58 is also connected to the multiplier 62.

When the pickup coils 34, 36, 38, and 40 of the system shown in FIG. 3 are in the horizontal positions shown with respect to an electromagnetic signal positioned in the direction shown, maximum voltage is supplied to the amplifier 42 while approximately .707 of the maximum voltage is applied to the amplifiers 44 and 46, and substantially no voltage signal is applied to the amplifier 48. Thus, the detectors 50, 52 and 54 each supply a signal to the AND gate 58 while the detector 50 simultaneously supplies the maximum signal to the difference amplifier 60 as well as the multiplier 62. Since the detector 56 supplies no input to the difference amplifier 60, the output of the difference amplifier which is supplied to the multiplier 62 is at a maximum. Since the AND gate 58 is receiving the necessary three input signals, it provides an output which is fed to and enables the multiplier 62 to provide a maximum output signal at an output 64.

Any number of coils like coils 38 and 40 can be added at different angles to the system shown in FIG. 3. Since the logical AND circuit like 58 would require the presence of simultaneous signals on all the amplifiers connected to such coils and amplifiers 44 and 46 in addition to amplifier 42 in order to enable the multiplier 62 to perform its gain multiplying function, the validity of a fix with such a system even in the presence of noise (low signal strength, jamming, etc.), would be greatly enhanced.

Figure 4:
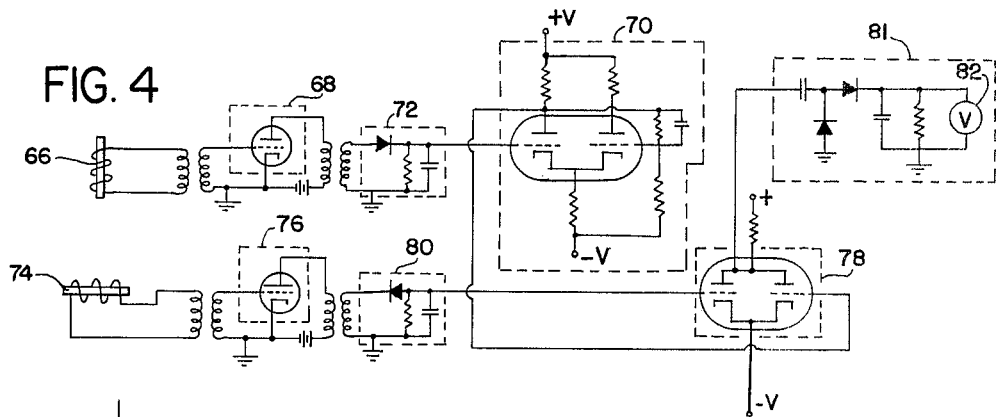
FIG. 4 is a schematic electrical circuit diagram of more apparatus constructed according to the instant invention.

Referring now to FIG. 4 a directional pickup coil 66 provides the input voltage to an amplifier 68. The amplifier 68 provides one input to a pulser 70 through a detector 72. A directional pickup coil 74 having the plane of its coil substantially perpendicular to the plane of the coil 66 provides the input voltage to an amplifier 76. The amplifier 76 provides one input to a gate 78 through a detector 80. The other input to the gate 78 is supplied from the pulser 70. The output of the gate 78 provides the input to a count rate circuit 81 which includes a voltmeter 82.

When the pickup coils 66 and 74 are disposed as shown in FIG. 4 with the plane of reception of the coil 74 parallel to the vector pointing in the direction of the electromagnetic signal of interest as indicated in the drawings, maximum voltage is supplied to the gate 78 through the detector 80 while no signal is supplied to the gate 78 from the pulser 70 since the coil 66 is in its null position with respect to said electromagnetic signal. When the plane of reception of the coil 66 is not perpendicular to the vector pointing in the direction of the electromagnetic signal of interest as indicated in the drawings, some voltage is supplied by the pulser 70 to the gate 78. Whenever some voltage is supplied by the pulser 70 to the gate 78 no signal will pass through the gate 78 to the count rate circuit 81. Thus, only when the pickup coil 66 is in its null position will the gate 78 permit the passage of the maximum signal from the pickup coil 74 to the count rate circuit 81.

As is well known in the art, the pulser 70 can be biased so that certain small signals received from the detector 72 will not be large enough to trigger the pulser to feed signals to the gate 78 and thereby inhibit said gate. In addition it will be noted that in this system pulses from the null pickup coil 66 and pulser 70 cannot enter into the count rate 80. When the pickup coil 66 is in its null position or very close thereto, depending upon the biasing of the pulser 70, the pulser 70 will not inhibit the gate 78 so any signal produced in the maximum pickup coil 74 circuit will pass on to the count rate circuit 81 where it can be averaged.

Figure 5:
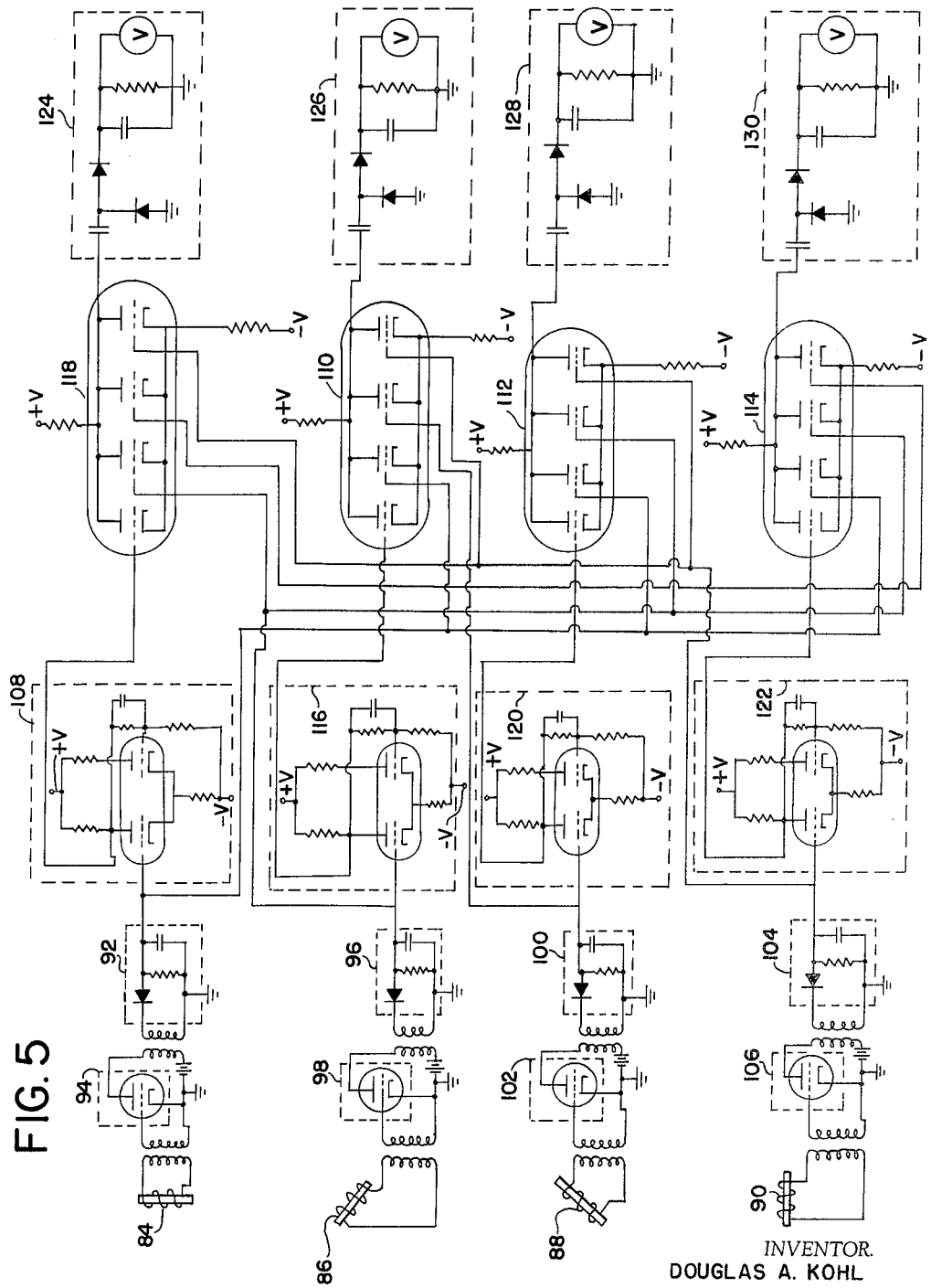
FIG. 5 is a schematic electrical circuit diagram of another more complex form of the present invention.

The system of FIG. 5 is very similar to that of FIG. 4 except that the pickup coils 84, 86, 88 and 90 are arranged with horizontal angular spacings of 45°. It will be noted that the pickup coil 84 provides an input voltage to a detector 92 through an amplifier 94, the pickup coil 86 provides an input voltage to a detector 96 through an amplifier 98, the pickup coil 88 provides an input voltage to a detector 100 through an amplifier 102, and the pickup coil 90 provides an input voltage to a detector 104 through an amplifier 106. The detector 92 simultaneously provides an input to a pulser 108 and to AND gates 110, 112, and 114. The detector 96 simultaneously provides an input to a pulser 116 and to AND gates 118, 112, and 114. The detector 100 simultaneously provides an input to a pulser 120 and to AND gates 118, 110, and 114. The detector 104 simultaneously provides an input to a pulser 122 and to AND gates 118, 110, and 112. The AND gates 118, 110, 112, and 114 are so constructed that receipt of a signal from the pulser 108, 116, 120, and 122, respectively inhibits said AND gates and thus prevents them from passing a signal to their associated count rate circuits 124, 126, 128, and 130.

The pulsers 108, 116, 120, and 122 are similar to the pulser 70 of FIG. 4. That is, they can be biased in such a way that not only when their associated pickup coils are in their null position, i.e., when the planes of reception of said coils are perpendicular to the direction of the vector pointing at an electromagnetic signal of interest, but also when they are slightly off of such null position that said pulsers will not provide signals to their associated AND gates and thereby inhibit said AND gates. In all other situations said pickup coils 84, 86, 88 and 90 will cause their associated pulsers 108, 116, 120 and 122 to inhibit the AND gates connected to said pulsers.

When the AND gates 118, 110, 112 and 114 are inhibited no signal indicative of the other three inputs thereto will be passed on to their respective count rates 124, 126, 128, and 130 where they can be averaged. Thus, to have an input to the count rate 124, it would be necessary that the pickup coil 84 be in substantially its null position and that the pickup coils 86, 88 and 90 each provide some input signal to the gate 118. Similarly to have an output for the gate 110 it would be necessary that the pickup coil 86 be in substantially its null position and that pickup coils 84, 88 and 90 each provide some input signal to gate 110, to have an output for the gate 112 it would be necessary that the pickup coil 88 be in substantially its null position and that pickup coils 84, 86, and 90 each provide some input signal to gate 112, and to have an output for gate 114 it would be necessary that the pickup coil 90 be in substantially its null position and that pickup coils 84, 86 and 88 each provide some input signal to gate 114. It will be readily apparent that for each output of gates 118, 110, 112 and 114 a different loop is the null loop.

A multiple pickup coil system such as is shown in FIG. 5 may employ many pickup coils in a rotating array or in a static or non-rotating array. When such pickup coils have their planes of reception angularly spaced an equal number of degrees apart, complete 360° azimuth coverage may be otbained when the direction resolution is made equal to such spacing. For each increment of such spacing all of said coils except one would be required to provide a positive output above a predetermined trigger level and said one coil output would be below said predetermined trigger level in order to indicate the presence of a signal of interest in said increment. In such a system variation in receiver gain, including catastrophic failure, would not cause false data to be tabulated in terms of azimuth, i.e., the direction of the vector pointing directly at the electromagnetic signal of interest.

Referring now more particularly to FIG. 6, a directional pickup coil 132 provides the input to a detector 134 through an amplifier 136. The detector 134 provides an input to the primary of a transformer 138 through a pulse amplifier 140. A cathode follower 142 is connected to the secondary of the transformer 138 through a diode 144. The cathode of the cathode follower 142 is connected to a gate 146 through a resistor 148. A diode 152 is connected in parallel with the resistor 148. The output of the gate 146 provides the input to a count rate circuit 154.

A directional pickup coil 156 having its plane of reception perpendicular to the plane of reception of pickup coil 132 provides the input to a detector 158 through an amplifier 159. The detector 158 provides the input to the primary coil of a transformer 160 through a pulse amplifier 162. A cathode follower 164 is connected to the secondary of the transformer 160 through a diode 166. A gate 168 is connected to the cathode of the cathode follower 164 through a resistor 170. A diode 174 is connected in parallel with the resistor 170. The output of the gate 168 provides the input to a count rate circuit 176.

The coils 132 and 156 are mounted with their axes in the horizontal plane. A directional pickup coil 178 mounted with its axis in a vertical plane provides an input to a detector 180 through an amplifier 182. The output of the detector 180 is simultaneously impressed upon a diode 184 and upon a diode 186 which are connected to the cathode followers 142 and 164 respectively.

The parallel connected resistor 148 and diode 152 are linked to a secondary coil 188 of the transformer 160 through a capacitor 190. Another secondary coil 192 of the transformer 160 provides a second input to the gate 146. The parallel connection of the resistor 170 and the diode 174 is connected to a secondary coil 194 of the transformer 138 through a capacitor 196. Another secondary coil 198 of the transformer 138 provides a second voltage input to the gate 168.

When the pickup coils 132 and 156 are so disposed that the plane of reception of the coil 156 is parallel to the vector A pointing in the direction of the electromagnetic signal of interest as indicated in FIG. 6, maximum voltage is supplied to the primary of the transformer 160 and minimum voltage is supplied to the primary of the transformer 138. The secondary coil 188 of the transformer 160 provides through its associated circuit a signal across the resistor 148 proportional to the maximum signal received by the pickup coil 156 but delayed slightly until after the signal impulse has reached its maximum instant. As long as the signal from the cathode follower 142, i.e., the signal representative of the signal picked up by the coil 132, is less than the signal across the resistor 148, then the signal impressed upon the secondary coil 192 of the transformer 160 will be passed through the gate 146 to the count rate circuit 154. If, on the other hand, the signal at the cathode of the cathode follower 142 is greater than the signal across the resistor 148, the gate 146 would not be enabled and would not let the signal from the secondary coil 192 pass to the count rate 154. These situations are graphically illustrated in FIG. 7 where a numeral 200 depicts the input, E, to the primary of transformer 160 with respect to time. Curve 202 depicts the voltage, KE, present at winding 188 of transformer 160, while numeral 204 depicts a null voltage at the cathode of the cathode follower 142 greater than the voltage, KE, at winding 188, and 206 shows such a null voltage less than the voltage across winding 188.

A capacitor 149 and a capacitor 171 in the cathode follower circuits 142 and 164, respectively, act to prolong the pulses occurring at said cathodes so that the delayed pulse voltage which can occur across resistor 148 and resistor 170 respectively, will be added to the substantially correct value of the peak cathode follower voltages of 142 and 164 respectively.

FIG. 8 illustrates that the system of FIG. 6 will pass only signals which lie within a preassigned azimuth increment, $\Delta Z$, because the reference level, KE, must vary with different pulse heights as illustrated. For example, $E_{210}$ is derived from a signal that is weaker than the signal which created $E_{212}$. The variation in peak pulse amplitude, E, with azimuth is a cosine-sine variation. Numeral 200 of FIG. 7 illustrates the wave form of an actual pulse E in the primary of the transformer 160 due to a signal detected by the maximum receiver 156. Curve 202 represents the voltage equivalent of the desired accuracy, $\Delta Z$. Curve 202 is a predetermined constant K times the actual pulse E. At this point it should be noted that $K=\sin \Delta Z/Z$ and is numerically equal to the turns ratio of winding 194 to winding 199 on transformer 138, or winding 188 to winding 193 on transformer 160. Thus, as previously stated, when the signal from the null receiver, 132 of FIG. 6, is less than KE as shown by curve 206, then the E signal should be passed through the gate and its source lies within the acceptance angle, $\Delta Z$. If the null signal is greater than KE as shown by curve 204, then the signals are inhibited.

If the signals originate in the direction of signal B, as shown in FIG. 6, then it is obvious that the functioning of the circuits will be reversed with detection coil 156 receiving substantially zero signal and detection coil 132 receiving maximum. Output would thus occur to count rate circuit 176.

The detector coil 178 has its detection plane horizontal and thus will not be responsive to a vertically polarized signal. If a signal is detected with oblique polarization, the signal is detected by detector 180 after amplification by amplifier 182. The signal from detector 180 is applied to cathode follower 142 and cathode follower 164 and acts to inhibit output from gate 146 and gate 168 in the identical function to that derived from signals present in horizontal detection coils 132 and 156.

Figure 9:
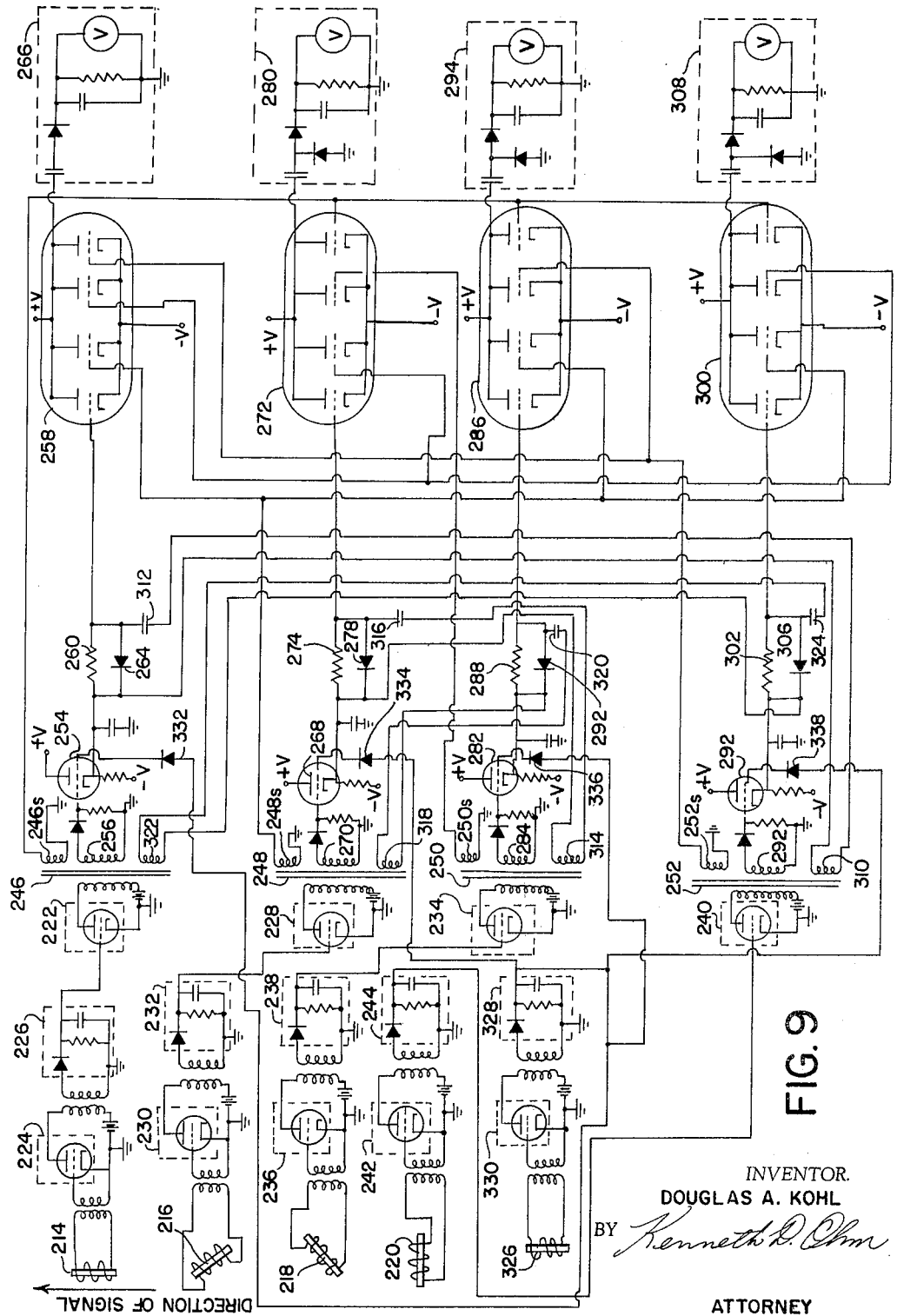
FIG. 9 is a schematic electrical circuit diagram of a more complex form of the present invention.

Referring now to FIG. 9, which is similar to FIG. 6 except that pickup coils 214, 216, 218 and 220 are arranged with horizontal angular spacings of 45° with the plane of reception of the coil 214 substantially perpendicular to the plane of reception of coil 220. The plane of reception of the coil 218 is substantially perpendicular to the plane of reception of the coil 216.

The pickup coil 214 provides the input to a pulse amplifier 222 through an amplifier 224 and a detector 226. The pickup coil 216 provides an input to a pulse amplifier 228 through an amplifier 230 and a detector 232. The pickup coil 218 provides an input to a pulse amplifier 234 through an amplifier 236 and a detector 238. The pickup coil 220 provides an input to a pulse amplifier 240 through an amplifier 242 and a detector 244. The output of the pulse amplifiers 222, 228, 234 and 240 are fed to the primary coils of transformers 246, 248, 250 and 252, respectively. A cathode follower 254 is connected to a secondary coil 256 of the transformer 246. The cathode of the cathode follower 254 is connected to a AND gate 258 through a resistor 260. A diode 264 is connected in parallel with the resistor 260. The output of the AND gate 258 is connected to a count rate 266.

A cathode follower 268 is connected to a secondary coil 270 of the transformer 248. The cathode of the cathode follower 268 is connected to a AND gate 272 through a resistor 274. A diode 278 is connected in parallel with the resistor 274. The output of the AND gate 272 is connected to a count rate 280.

A cathode follower 282 is connected to a secondary coil 284 of the transformer 250. The cathode of the cathode follower 282 is connected to a AND gate 286 through a resistor 288. A diode 292 is connected in parallel with the resistor 288. The output of the AND gate 286 is fed to a count rate circuit 294.

A cathode follower 296 is connected to a secondary coil 298 of the transformer 252. The cathode of the cathode follower 296 is connected to a AND gate 300 through a resistor 302. The resistor 302 is connected in parallel with a diode 306. The output of the AND gate 300 is fed to a count rate 308.

The parallel connected resistor 260 and diode 264 are connected to a secondary coil 310 of the transformer 252 through a capacitor 312. The parallel connected resistor 274 and diode 278 are connected to a secondary coil 314 of the transformer 250 through a capacitor 316. The parallel connected resistor 288 and diode 292 are connected to a secondary coil 318 of the transformer 248 through a capacitor 320. The parallel connected resistor 302 and diode 306 are connected to a secondary coil 322 of the transformer 246 through a capacitor 324.

A secondary coil 246s provides one input simultaneously to each of the AND gates 272, 286 and 300. A secondary coil 248s of transformer 248 provides one input simultaneously to each of the AND gates 258, 286 and 300. A secondary coil 250s provides simultaneously one input to each of the AND gates 258, 272 and 300. A secondary coil 252s of the transformer 252 simultaneously supplies an input to each of the gates 258, 272, and 286.

A directional pickup coil 326 having its axis substantially vertical supplies an input to a detector 328 through an amplifier 330. The output of the detector 328 is simultaneously fed to diodes 332, 334, 336, and 338.

When the pickup coils 214, 216, 218, and 220 are disposed so that the plane of the coil 214 is perpendicular to the vector pointing in the direction of the electromagnetic signal of interest as indicated in FIG. 9, minimum voltage is supplied to the transformer 246, maximum voltage is supplied to the transformer 252, and approximately .707 maximum voltage is supplied to the transformers 248 and 250. The circuitry associated with the transformers 246, 248, 250, and 252 between said transformers and AND gates 258, 272, 286, and 300 respectively, function in the same manner as the similar circuits shown and described in FIG. 6.

The AND gate 258 only supplies an input to the count rate circuit 266 when the voltage across the resistor 260 is less than the voltage at the cathode of the cathode follower 254 simultaneously with the existence of signals from the transformer coils 248s, 250s and 252s. The AND gate 272 only supplies an input to the count rate 280 when the voltage across the resistor 274 is less than the voltage at the cathode of the cathode follower 268 simultaneously with the existence of signals from the transformer coils 246s, 250s and 252s. The AND gate 286 only supplies an input to the count rate 294 when the voltage across the resistor 288 is less than the voltage at the cathode of the cathode follower 282 simultaneously with the existence of signals from the transformer coils 246s, 248s and 252s. The AND gate 300 only supplies an input to the count rate 308 when the voltage across the resistor 302 is less than the voltage at the cathode of the cathode follower 296 simultaneously with the existence of signals from the transformer coils 246s, 248s, and 250s.

With the system shown in FIG. 9 a different coil is used as the null loop coil for each of the inputs to the count rates 266, 280, 294 and 308. An input to each of these count rates requires a coincident output by three of the pickup coils and an output of less than a predetermined value by the other pickup coil. For example, for vertically polarized signals there will only be an input to the count rate 266 with a coincident output from the detectors 232, 238 and 234 and an output of less than a predetermined amount from the detector 226. The output of the detector 226 must create an output on the cathode of the cathode follower 254 which is less than the predetermined voltage across the resistor 260 which is derived through the transformer 252. Each of the AND gates 272, 286 and 300 work similarly in that each one will only supply an input to its associated count rate 280, 294, and 308, respectively, when the output of the pickup coils 216, 218, 220 respectively are less than a predetermined amount and when the other three inputs to each such gate is present.

Whenever a non-vertically polarized electromagnetic signal is sensed by the pickup coil 326, there is created an output voltage in the detector 328. When this happens there is a possibility that there will be no input to any of the count rates 266, 280, 294, and 308. This situation occurs when the signal from the detector 328 working through the diodes 332, 334, 336, and 338 establishes a voltage on the cathodes of the cathode followers 254, 268, 282, and 296, respectively, which exceeds the voltages created across the resistors 260, 274, 288, and 302, respectively.

Although only four horizontal pickup coils arranged with angular spacing of 45° are shown in FIG. 9, more such pickup coils may be used in either a rotating array or a static or non-rotating array. Thus, the present description, although showing only four horizontal pickup coils for ease of explanation of the invention, is in no way limited to only this number. The pickup coils described in this specification may be either rotating or stationary.

In view of the principles set forth herein, I have shown some of the ways of carrying out the present invention and some of the equivalents which are suggested by these disclosures.

Now therefore I claim:

1. A direction finder for determining the direction line of an electromagnetic signal comprising a first directional pickup coil, an amplifier means connected to the output of said first coil, a second directional pickup coil positioned with its plane of reception substantially perpendicular to the plane of reception of said first pickup coil, a second amplifier means connected to the output of said second pickup coil, voltage comparison means connected to the output of both of said amplifiers, reference voltage means connected to said voltage comparison means for providing a predetermined reference voltage, said voltage comparison means being adapted to provide a maximum output signal only when one of said pickup coils provides an output which is less than said reference voltage.

2. A direction finder for determining the direction line of an electromagnetic signal comprising a first directional pickup coil, a first amplifier means connected to the output of said first coil, a first detector means connected to the output of said first amplifier means, a second directional pickup coil mounted with its plane of reception substantially perpendicular to the plane of reception of the first pickup coil, a second amplifier means connected to the output of said second pickup coil, a second detector means connected to the output of said second amplifier means, a difference amplifier with a first input connected to the output of said first detector means and with a second input connected to the output of said second detector means and a multiplier with a first input connected to said output of said first detector and with a second input connected to the output of the difference amplifier.

3. A direction finder for determining the direction line of an electromagnetic signal comprising a first directional pickup coil, a first amplifier connected to the output of said first pickup coil, a second directional pickup coil having its plane of reception forming an acute angle with the plane of reception of the first pickup coils, a second amplifier connected to the output of the second pickup coil, a third directional pickup coil positioned with its plane of reception forming an acute angle with the plane of reception of said first pickup coil, a third amplifier connected to the output of the third pickup coil, a fourth directional pickup coil positioned with its plane of reception substantially perpendicular to the plane of reception of the first pickup coil, a fourth amplifier connected to the output of the fourth pickup coil, an AND gate connected to the outputs of the first, second and third amplifiers, a difference amplifier connected to the output of the first amplifier and to the output of the fourth amplifier, and a multiplier connected to the output of the first amplifier and to the output of the difference amplifier and to the output of the AND circuit.

4. A direction finder for determining the direction line of an electromagnetic signal comprising a first directional pickup coil, a first amplifier connected to the output of said first pickup coil, a first detector connected to the output of said first amplifier, a second directional pickup coil having its plane of reception forming an acute angle with the plane of reception of the first pickup coil, a second amplifier connected to the output of said second pickup coil, a second detector connected to the output of said second amplifier, a third directional pickup coil positioned with its plane of reception forming an acute angle with the plane of reception of said first pickup coil, a third amplifier connected to the output of said third pickup coil, a third detector connected to the output of said third amplifier, a fourth directional pickup coil positioned with its plane of reception substantially perpendicular to the plane of reception of said first pickup coil, a fourth amplifier connected to the output of said fourth pickup coil, a fourth detector connected to the output of said fourth amplifier, an AND gate having first, second and third inputs, said first input being connected to the output of said first detector, said second input being connected to the output of said second detector, said third input being connected to the output of said third detector, a difference amplifier connected to the output of said first detector and to the output of the fourth detector, and a multiplier connected to the output of said first detector and to the ouput of said difference amplifier and to the output of said AND circuit.

5. A direction finder for determining the direction line of an electromagnetic signal comprising a first directional pickup coil, a first amplifier connected to the output of said first pickup coil, a second directional pickup coil having its plane of reception substantially perpendicular to the plane of reception of said first pickup coil, a second amplifier connected to the output of said second coil, reference circuit means for providing an enable output signal whenever the output of said first amplifier is less than a predetermined amount, gate means connected to the output of said reference circuit means and to the output of said second amplifier, said gate means adapted to only provide an output when it receives an enable signal from said reference circuit means coincident with a signal from said second amplifier.

6. A direction finder for determining the direction line of an electromagnetic signal comprising a first directional pickup coil, a first amplifier connected to the output of said first pickup coil, a second directional pickup coil having its plane of reception substantially perpendicular to the plane of reception of said first pickup coil, a second amplifier connected to the output of said second coil, a pulser for providing an enable output signal whenever the output of said first amplifier is less than a predetermined amount, gate means connected to the output of said pulser and to the output of said second amplifier, said gate means adapted to only provide an output when it receives an enable signal from said pulser coincident with a signal from said second amplifier.

7. A direction finder for determining the direction line of an electromagnetic signal comprising a plurality of directional pickup coils including a first pickup coil and a second pickup coil having its plane of reception substantially perpendicular to the plane of reception of said first pickup coil, amplifier means associated with each pickup coil, voltage comparison means connected to the output of each amplifier means, each said voltage comparison means being adapted to provide an enable output signal when the input thereto from its connected amplifier is less than a predetermined amount, and an individual gate means connected to each of the individual outputs of said voltage comparison means, each of said amplifiers in addition to being connected to one of said gate means through its associated voltage comparison means is also connected to one input of each of the other gate means, each of said gate means being constructed to only provide an output when there is coincidence between all the amplifier inputs thereto and an enable signal from its connected voltage comparison means.

8. A direction finder for determining the direction line of an electromagnetic signal comprising a first directional pickup coil, a first amplifier connected to the output of said first coil, a first voltage comparison means connected to the output of said first amplifier, said first voltage comparison means adapted to provide an enable signal when the output of the first amplifier is less than a predetermined amount, a first gate means connected to the output of said first voltage comparison means, a second directional pickup coil having its plane of reception forming an acute angle with the plane of reception of said first pickup coil, a second amplifier connected to the output of said second pickup coil, a second voltage comparison means connected to the output of said second amplifier, said second voltage comparison means adapted to provide an enable signal when the output of said second amplifier is less than a predetermined amount, a second gate means connected to the output of said second voltage comparison means, a third directional pickup coil having its plane of reception forming an acute angle with the plane of reception of said first pickup coil, a third amplifier connected to the output of said third pickup coil, a third voltage comparison means connected to the output of said third amplifier, said third voltage comparison adapted to provide an enable signal when the output of said third amplifier is less than a predetermined amount, a third gate means connected to the output of said third voltage comparison means, a fourth directional pickup coil having its plane of reception substantially perpendicular to the plane of reception of said first pickup coil, a fourth amplifier connected to the output of said fourth coil, a fourth voltage comparison means connected to the output of said fourth amplifier, said fourth voltage comparison means adapted to provide an enable signal when the output of said fourth amplifier is less than a predetermined amount, a fourth gate means connected to the output of said fourth voltage comparison means, said first gate means also being connected to said second, third and fourth amplifier outputs, said second gate means also being connected to said first, third and fourth amplifier outputs, said third gate means also being connected to the outputs of said first, second and fourth amplifiers, said fourth gate means also being connected to the outputs of said first, second and third amplifiers, each of said gate means adapted to only provide an output signal when receiving an enable signal from its connected voltage comparison means coincident with the receipt of signals from the three amplifiers connected to each said gate.

9. A direction finder for determining the direction lines of an electromagnetic signal comprising a first directional pickup coil, a first amplifier connected to the output of said first coil, a first detector connected to the output of said first amplifier, a first pulser means connected to the output of said first detector, said first pulser means adapted to provide an enable signal when the output of the first detector is less than a predetermined amount, a first gate means connected to the output of said first pulser means, a first count rate means connected to the output of said first gate means, a second directional pickup coil having its plane of reception forming an acute angle with the plane of reception of said first pickup coil, a second amplifier connected to the output of said second pickup coil, a second detector connected to the output of said second amplifier, a second pulser means connected to the output of said second detector, said second pulser means adapted to provide an enable signal when the output of said second detector is less than a predetermined amount, a second gate means connected to the output of said second pulser means, a second count rate means connected to the output of said second gate means, a third directional pickup coil having its plane of reception forming an acute angle with the plane of reception of said first pickup coil, a third amplifier connected to the output of said third pickup coil, a third detector connected to the output of said third amplifier, a third pulser means conected to the output of said third detector, said third pulser means adapted to provide an enable signal when the output of said third detector is less than a predetermined amount, a third gate means connected to the output of said third pulser means, a third count rate means connected to the output of said third gate means, a fourth directional pickup coil having its plane of reception substantially perpendicular to the plane of reception of said first pickup coil, a fourth amplifier connected to the output of said fourth coil, a fourth detector connected to the output of said fourth amplifier, a fourth pulser means connected to the output of said fourth detector, said fourth pulser means adapted to provide an enable signal when the output of said fourth detector is less than a predetermined amount, a fourth gate means connected to the output of said fourth pulser means, a fourth count rate means connected to the output of said fourth gate means, said first gate means also being connected to said second, third and fourth detector outputs, said second gate means also being connected to said first, third and fourth detector outputs, said third gate means also being connected to the outputs of said first, second and fourth detector outputs, said fourth gate means also being connected to the outputs of said first, second and third detectors, each of said gate means adapted to only provide an input signal to its connected count rate means when said gate means is receiving an enable signal from its connected pulser means coincident with the receipt of signals from the three detectors connected to each said gate.

10. A direction finder for determining the direction line of an electromagnetic signal comprising a first directional pickup coil, a first amplifier connected to the output of said first pickup coil, a second directional pickup coil having its plane of reception substantially perpendicular to the plane of reception of said first pickup coil, a second amplifier connected to the output of said second pickup coil, a voltage ratio means connected to the output of said second amplifier, a gate means having one input thereof connected to the output of said second amplifier, a voltage comparison means connected to the output of said first amplifier and to said voltage ratio means so that a predetermined portion of the output of said second amplifier means is fed into said voltage comparison means, the output of said voltage comparison means being connected to a second input of said gate means.

11. A direction finder like that set forth in claim 10 in which said first and second pickup coils are positioned with their axes in substantially horizontal planes and which includes a third directional pickup coil having its axis in a substantially vertical plane, a third amplifier connected to the output of said third pickup coil, a detector connected to the output of said third amplifier, a first diode connected between the output of said third detector and said voltage comparison means in such a manner as to prevent any output from said voltage comparison means when the output of said detector exceeds a predetermined value.

12. A direction finder for determining the direction line of an electromagnetic signal comprising a first directional pickup coil, a first amplifier connected to the output of said first pickup coil, a second directional pickup coil having its plane of reception substantially perpendicular to the plane of reception of said first pickup coil, a second ampifier connected to the output of said second pickup coil, a difference amplifier connected to the output of said first amplifier, a voltage ratio means connected to the output of said second amplifier, a gate connected to the output of said second amplifier, said gate also being connected to the output of said difference amplifier, said difference amplifier being connected to said voltage ratio means so that a predetermined portion of the output of said second amplifier will be supplied to said difference amplifier, said difference amplifier providing an input to said gate means only when the signal supplied to said difference amplifier from said first amplifier is less than the signal supplied to said difference amplifier from said first voltage ratio means.

13. A direction finder like that set forth in claim 12 in which said first and second pickup coils are positioned with their axes in substantially horizontal planes and which includes a third directional pickup coil having its axis in substantially vertical plane, a third amplifier connected to the output of said third pickup coil, a detector connected to the output of said third amplifier, a first diode connected between the output of said detector and the difference amplifier in such a manner as to prevent any output from said difference amplifier when the output of said detector exceeds a predetermined value.

14. A direction finder for determining the direction line of an electromagnetic signal comprising a first directional pickup coil, a first amplifier connected to the output of said first coil, a first difference amplifier connected to the output of said first amplifier, a first gate connected to the output of said first difference amplifier, a second directional pickup coil having its plane of reception substantially perpendicular to the plane of reception of said first pickup coil, a second amplifier connected to the output of said second pickup coil, a first voltage ratio means connected to the output of said second amplifier, another input of said first difference amplifier connected to said first voltage ratio means so that a predetermined portion of the output of said second amplifier is fed to said first difference amplifier, another input of said first gate being connected to the output of said second amplifier, a second difference amplifier connected to the output of said second amplifier, a second gate connected to the output of said second difference amplifier, a second voltage ratio means connected to the output of said first amplifier, a second input of said second difference amplifier connected to said second voltage ratio means so that a predetermined portion of the output of said first amplifier is fed to said second difference amplifier, a second input of said second gate being connected to the output of said first amplifier, a third directional pickup coil having its axis in a vertical plane, a third amplifier connected to the output of said third pickup coil, a first inhibit means connected between said first gate and the output of said third amplifier, and a second inhibit means connected between said second gate and the output of said third amplifier.

15. A direction finder for determining the direction line of an electromagnetic signal comprising a first directional pickup coil, a first amplifier connected to the output of said first coil; a first difference amplifier connected to the output of said first amplifier, a first gate connected to the output of said first difference amplifier, a second directional pickup coil having its plane of reception substantially perpendicular to the plane of reception of said first pickup coil, a second amplifier connected to the output of said second pickup coil, a first voltage ratio means connected to the output of said second amplifier, another input of said first difference amplifier means connected to said voltage ratio means so that a predetermined portion of the output of said second amplifier is fed to said first difference amplifier, another input of said first gate being connected to the output of said second amplifier, a second difference amplifier connected to the output of said second amplifier, a second gate connected to the output of said second difference amplifier, a second voltage ratio means connected to the output of said first amplifier, a second input of said second difference amplifier connected to said second voltage ratio means so that a predetermined portion of the output of said first amplifier is fed to said second difference amplifier, a second input of said second gate means being connected to the output of said first amplifier, a third directional pickup coil means having its plane of reception forming an acute angle with the plane of reception of said first coil, a third amplifier connected to the output of said third pickup coil, a third difference amplifier connected to the output of said amplifier, a third gate connected to the output of said third difference amplifier, a fourth directional pickup coil having its plane of reception substantially perpendicular to the plane of reception of said third pickup coil, a fourth amplifier connected to the output of said fourth pickup coil, a third voltage ratio means connected to the output of said fourth amplifier, another input of said third difference amplifier being connected to said third voltage ratio means so that a predetermined portion of the output of the fourth amplifier is fed to said third difference amplifier, another input of the third gate being connected to the output of said fourth amplifier, a fourth difference amplifier connected to the output of said fourth amplifier, a fourth gate connected to the output of said fourth difference amplifier, a fourth voltage ratio means connected to the output of said third amplifier, a second input of said fourth difference amplifier connected to said fourth voltage ratio means so that a predetermined portion of the third amplifier output is fed to said fourth difference amplifier, another input of said fourth gate connected to the output of said third amplifier, a third input to the first gate connected to the output of said third amplifier, a fourth input to the first gate conneced to the output of of said fourth amplifier, a third input to the second gate connected to said third amplifier, a fourth input to the second gate connected to the output of said fourth amplifier, a third input to the third gate connected to the output of said first amplifier, a fourth input to the third gate connected to the output of said second amplifier, a third input to the fourth gate connected to the output of said first amplifier, a fourth input to the fourth gate connected to the ouput of said second amplifier, a fifth directional pickup coil having its axis in a vertical plane, a fifth amplifier connected to the output of said fifth pickup coil, a first inhibit means connected between said first gate and the output of said fifth amplifier, a second inhibit means connected between said second gate and the output of said fifth amplifier, a third inhibit means connected between said third gate and the output of said fifth amplifier, and a fourth inhibit means connected between said fourth gate and the output of said fifth amplifier.

References Cited by the Examiner

UNITED STATES PATENTS 2,026,254   12/1935   Sandfort _____ 343—119
2,061,737   11/1936   Offenhauser _____ 343—115

MAYNARD P. WILBUR, *Primary Examiner.*

CHESTER L. JUSTUS, *Examiner.*